Patented Jan. 19, 1943

2,308,982

UNITED STATES PATENT OFFICE 2,308,982

ABRASIVE ARTICLE COMPRISING A BOND HAVING A FILLER THEREIN

Samuel S. Kistler, West Boylston, Mass., assignor to Norton Company, Worcester, Mass., a corporation of Massachusetts No Drawing. Application February 4, 1942, Serial No. 429,502

7 Claims. (Cl. 51—295)

This invention relates to abrasive articles and more particularly to grinding wheels having abrasive grains united by various types of bonding materials, and wherein the bond contains a filler or agent capable of modifying or improving the abrading properties.

One object of this invention is to provide an active filler for grinding wheels or other abrasive bodies which has a high quality number, the quality number being based upon material removed squared divided by wheel wear, which approximates a scale of economy in grinding with allowance for labor cost and overhead.

Another object of the invention is to provide a filler for the production of economical and free cutting grinding wheels, the supply of which filler is not liable to be cut off.

Another object of the invention is to provide an inexpensive filler which is superior to others in the same price range. Other objects will be apparent in the following disclosure.

In accordance with my invention, I have found that the quality of grinding wheels and other abrasive articles is materially improved by incorporating potassium calcium sulfate therein. This substance is a double salt having the formula $K_2Ca(SO_4)_2$, and it may be obtained by suitable chemical synthesis or derived from the minerals known as syngenite and caluszite. The double salt has a melting point of 1004° C. It is substantially insoluble in water and so will not induce corrosion of a work piece. The material is best adapted for a grinding wheel which is used in a dry grinding operation.

The quality of a grinding wheel may be approximately indicated by the figure M squared divided by W, where M is material removed and W is wheel wear, both in unit time. I have put potassium calcium sulfate and kaolin in identical wheels. I have further made numerous tests and thereby shown that kaolin is substantially the same as quartz as a filler. Quartz has been widely used as a cheap but efficient filler in grinding wheels. Two wheels were made, each comprising fused alumina abrasive bonded with phenol formaldehyde condensation product, each having 58% of abrasive and 16% of pores, the remainder bond, all by volume. Each wheel contained 4% of calcium oxide as a dehydrating agent. One wheel contained 21% of the bond of potassium calcium sulfate filler and the other wheel contained 21% of the bond of kaolin filler. The wheels were in every respect identical except that they had different fillers. The grinding results are shown by the following table:

| Filler | Material removed by weight M | Wheel wear by weight W | $\frac{M^2}{W}$ |
|---|---|---|---|
| Potassium calcium sulfate | 1,650 | 280 | 97 |
| Kaolin | 875 | 330 | 23 |

In a series of tests, potassium calcium sulfate has been found to be substantially the equal of cryolite as an active filler. Cryolite has for a number of years been the most widely used and efficient filler for grinding wheels. This salt is mined in Greenland and since there is no guarantee that the sea lanes will be open and, furthermore, ships are needed for many purposes and are also scarce, it is highly important to provide substitutes for cryolite in order that in the event of shortage of sufficient tonnage to insure a continued supply of cryolite, efficient grinding wheels may nevertheless be produced. In fact, at the present time it may be said that about the most important development in grinding is to find adequate, inexpensive, readily available, widely distributed substitutes for cryolite. Potassium calcium sulfate is such a substitute and in all respects a very satisfactory substitute. Circumstances could hardly arise in which it could not be readily produced in this country.

The potassium calcium sulfate filler may be incorporated in the bond or the abrasive and bond mixture in any desired proportion, such as from 5 to 60% by volume of the bond mass and preferably in amounts ranging from 10 to 35%. Ordinarily, the higher the content of the filler, the better is the quality of the abrasive article, within the above limits; but the quantity of filler may also be limited by the particular requirements of a given abrading operation.

As one example of carrying out the invention, I may proceed as follows: I provide a quantity of abrasive, such as fused alumina or silicon carbide, place it in a mixing pan, and wet it with furfural. I add a quantity of dry "A" stage phenol formaldehyde resin containing a suitable hardening agent, such as hexamethylene tetramine, and preferably also containing a small quantity of calcium oxide CaO as a dehydrating agent and further containing potassium calcium sulfate in any amount within the above limits. Mixing is continued and then a wheel is molded and cured in any known manner. That is, it may be hot pressed or it may be cold pressed and then baked in an oven. In a typical example of the foregoing, the potassium calcium sulfate was 21% of the bond by volume.

Another type of grinding wheel may be made of abrasive grains united by an organic resinoid bond containing aniline formaldehyde as its primary constituent. Such a wheel may be made, for example, of abrasive grains and bond proportioned to provide a structure of 54% abrasive grains and 0% of pores. The grains may be first wet or "plasticized" with furfural and then a mixture of aniline formaldehyde resin powder, and potassium calcium sulfate may be mixed with the grains. Such a mix may be molded and hot pressed to form a grinding wheel. Other fillers, such as cryolite, as well as dehydrating agents, such as CaO, and other ingredients may be incorporated in the bond mass if desired.

This active filler of the present invention may also be incorporated in a rubber bonded grinding wheel made by any usual or desired process.

A vitrified grinding wheel may have the filler incorporated therein by the following procedure. The bonded abrasive grinding wheel may be first made in accordance with standard practice to provide a given grade and percentage of porosity. The pores in the wheel form interconnected passages open at the surface of the wheel. These pores are thereafter impregnated with a mass comprising the potassium calcium sulfate suspended in a supplemental fluid bond, such as a standard "Bakelite" type of phenol formaldehyde condensation product in the liquid and incompletely converted state. The suspension of potassium calcium sulfate in the fluid resinoid may be forced into the wheel pores by suitable procedure. For example, the wheel may be placed in a vessel containing the filler suspended in the liquid bond and a vacuum may then be applied to draw the air out of the wheel and then when air is allowed to break the vacuum the atmospheric pressure forces the liquid and the filler into the pores of the wheel. Thereafter, the wheel may be subjected to a further heating operation to convert the liquid resin to its final infusible state. This forms a supplemental bond within the wheel pores which holds the filler interspersed substantially uniformly throughout the pores of the wheel structure. Rubber in a fluid condition, such as a solution of rubber or rubber latex containing the potassium calcium sulfate, may be used in place of the resin. Various other types of materials may be employed for carrying the filler and fixing it within the wheel pores.

Thus this invention involves the use of potassium calcium sulfate as a filler or modifying agent in various types of bonded abrasive articles, wherein the filler changes or improves the quality or grinding characteristics thereof. It serves primarily to make a grinding wheel freer or cooler cutting or to remove more metal per unit of time for a given rate of wheel wear. This filler may also be used to supplement or to replace parts of other suitable fillers, such as cryolite. In such a case the total amount of filler may lie within the above specified range and the potassium calcium sulfate may constitute any desired proportion thereof. Many modifications may be made in the composition of the abrasive article and in the methods of manufacture; hence the above disclosure is to be interpreted as illustrating the general principles of this invention and the preferred types and compositions of abrasive articles and not as limitations on the following claims.

I claim:

1. An abrasive article comprising abrasive grains, a bond uniting the grains as an integral body and a filler comprising potassium calcium sulfate interspersed throughout the bonded mass.

2. An abrasive article comprising abrasive grains, an organic bond uniting the grains as an integral body and a filler comprising finely divided, solid potassium sulfate interspersed throughout the bond.

3. An abrasive article comprising abrasive grains and a bond having as an essential ingredient a resinoid which unites the grains as an integral body, said bond having intimately associated therewith a filler comprising potassium calcium sulfate which constitutes from 5 to 60% by weight of the bond mass.

4. An abrasive article comprising abrasive grains and a bond therefor having as an essential ingredient a mass of vulcanized rubber containing from 5 to 60% of potassium calcium sulfate interspersed therethrough.

5. An abrasive article comprising abrasive grains, a vitrified ceramic bond uniting the grains as an integral body and proportioned to form interspersed pore spaces between the grains, and a supplemental bond and a filler comprising potassium calcium sulfate in said pore spaces, said filler constituting from 5 to 60% by weight of the supplemental bond.

6. An abrasive article comprising abrasive grains, a bond uniting the grains as an integral body which has as its primary constituent a converted phenol formaldehyde condensation product, and a solid granular filler incorporated in the bond containing potassium calcium sulfate which constitutes from 5 to 60% of the bond mass, by volume.

7. A grinding wheel comprising abrasive grains, a bond uniting the grains as an integral body which has as its primary constituent a heat converted phenol formaldehyde condensation product, and potassium calcium sulfate dispersed through the bond as a filler constituting from 10 to 35% by volume thereof.

SAMUEL S. KISTLER.